(12) United States Patent
Furusawa et al.

(10) Patent No.: US 11,394,030 B2
(45) Date of Patent: Jul. 19, 2022

(54) SECONDARY BATTERY

(71) Applicant: Panasonic Intellectual Property Management Co., Ltd., Osaka (JP)

(72) Inventors: Daisuke Furusawa, Osaka (JP); Tomoki Shiozaki, Osaka (JP); Hideharu Takezawa, Nara (JP); Takahito Nakayama, Osaka (JP); Yuji Oura, Osaka (JP); Takahiro Takahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 225 days.

(21) Appl. No.: 16/582,347

(22) Filed: Sep. 25, 2019

(65) Prior Publication Data

US 2020/0020951 A1    Jan. 16, 2020

Related U.S. Application Data

(63) Continuation of application No. PCT/JP2018/004546, filed on Feb. 9, 2018.

(30) Foreign Application Priority Data

Mar. 31, 2017  (JP) .............................. JP2017-070391

(51) Int. Cl.
*H01M 4/62* (2006.01)
*H01M 4/66* (2006.01)
(Continued)

(52) U.S. Cl.
CPC ............ *H01M 4/628* (2013.01); *H01M 4/131* (2013.01); *H01M 4/661* (2013.01); *H01M 4/667* (2013.01);
(Continued)

(58) Field of Classification Search
None
See application file for complete search history.

(56) References Cited

U.S. PATENT DOCUMENTS

2013/0224591 A1   8/2013   Kishimi et al.
2016/0093922 A1   3/2016   Endo et al.
2016/0190566 A1   6/2016   Shiozaki et al.

FOREIGN PATENT DOCUMENTS

JP    2016-072221 A      5/2016
JP    2016-127000 A  *  7/2016  ............ H01M 4/131
(Continued)

OTHER PUBLICATIONS

International Search Report dated May 1, 2018, issued in counterpart application No. PCT/JP2018/004546, with English translation. (4 pages).

*Primary Examiner* — Jonathan Crepeau
*Assistant Examiner* — Angela J Martin
(74) *Attorney, Agent, or Firm* — WHDA, LLP

(57) ABSTRACT

According to the present invention, a positive electrode is provided with: a positive electrode current collector which contains aluminum; a positive electrode mixture layer which contains a positive electrode active material that is configured of a lithium transition metal oxide; and an intermediate layer which is arranged between the positive electrode current collector and the positive electrode mixture layer. The intermediate layer contains inorganic compound particles, a conductive material and a binder; the circularity is from 5% to 75% (inclusive); the void fraction of the intermediate layer is from 30% to 69% (inclusive); and the average circularity of the inorganic compound particles is from 5% to 75% (inclusive).

9 Claims, 5 Drawing Sheets

(51) Int. Cl.
    *H01M 4/131*     (2010.01)
    *H01M 10/0525*     (2010.01)
    *H01M 10/0587*     (2010.01)
    *H01M 4/525*     (2010.01)
    *H01M 4/02*     (2006.01)

(52) U.S. Cl.
    CPC ....... *H01M 4/668* (2013.01); *H01M 10/0525* (2013.01); *H01M 10/0587* (2013.01); *H01M 4/525* (2013.01); *H01M 2004/028* (2013.01)

(56) References Cited

FOREIGN PATENT DOCUMENTS

| | | |
|---|---|---|
| JP | 2016-127000 A | 7/2016 |
| WO | 2013/125021 A1 | 8/2013 |
| WO | 2013/187458 A1 | 12/2013 |

\* cited by examiner

SECONDARY BATTERY

TECHNICAL FIELD

The present disclosure relates to a secondary battery.

BACKGROUND ART

A non-aqueous electrolyte secondary battery, which achieves charge and discharge by movement of lithium ions between positive and negative electrodes, has a high energy density and a large capacity, and is thus used widely as a power source for driving mobile digital assistants such as mobile phones, laptop computers, and smartphones, or as a power source for engines of electric tools, electric vehicles (EV), hybrid electric vehicles (HEV, PHEV), and the like, and thus wider spread use thereof is expected.

Patent Literature 1 discloses a positive electrode for a non-aqueous electrolyte secondary battery, the positive electrode comprising a protective layer between a positive electrode current collector including aluminum as a main component and a positive electrode mixture layer including a lithium transition metal oxide, the protective layer having a thickness of 1 μm to 5 μm and including: an inorganic compound having a lower oxidizing power than the lithium transition metal oxide; and an electrical conductor. According to Patent Literature 1, in the case where internal short circuit of a battery occurs, in the case where a battery is exposed to a high temperature, or in other cases, there is a possibility that a large amount of heat is generated by the oxidation-reduction reaction between a positive electrode active material and an aluminum collector, but such heat generation due to the oxidation-reduction reaction can be suppressed by the positive electrode for a non-aqueous electrolyte secondary battery, comprising the protective layer.

CITATION LIST

Patent Literature

PATENT LITERATURE 1: Japanese Unexamined Patent Application Publication No. 2016-127000

SUMMARY

A secondary battery in which heat generation of the battery, caused by occurrence of internal short circuit, is suppressed, and a cycle life is improved is demanded.

A secondary battery that is one aspect of the present disclosure, comprises: a positive electrode; a negative electrode; and an electrolyte, wherein the positive electrode comprises: a positive electrode current collector including aluminum; a positive electrode mixture layer including a positive electrode active material composed of lithium transition metal oxide; and an intermediate layer provided between the positive electrode current collector and the positive electrode mixture layer, the intermediate layer includes inorganic compound particles, an electrical conductor, and a binder, and the intermediate layer has a porosity of 30% or more and 69% or less, and when a visible outline of a sectional shape of each of the inorganic compound particles is interposed by two concentric circles, an interval of the two circles is minimized such that the inorganic compound particles have an average value of circularity of 5% or more and 75% or less, the circularity being represented by a ratio of a radius a of an inscribed circle of the two circles to a radius b of a circumscribed circle of the two circles, a/b, the interval of the two circles is a difference between the radius a of the inscribed circle and the radius b of the circumscribed circle.

According to the secondary battery of one aspect of the present disclosure, a secondary battery in which heat generation of the battery, caused by occurrence of internal short circuit, is suppressed, and a cycle life is improved may be provided.

DESCRIPTION OF EMBODIMENTS

Figure 1:
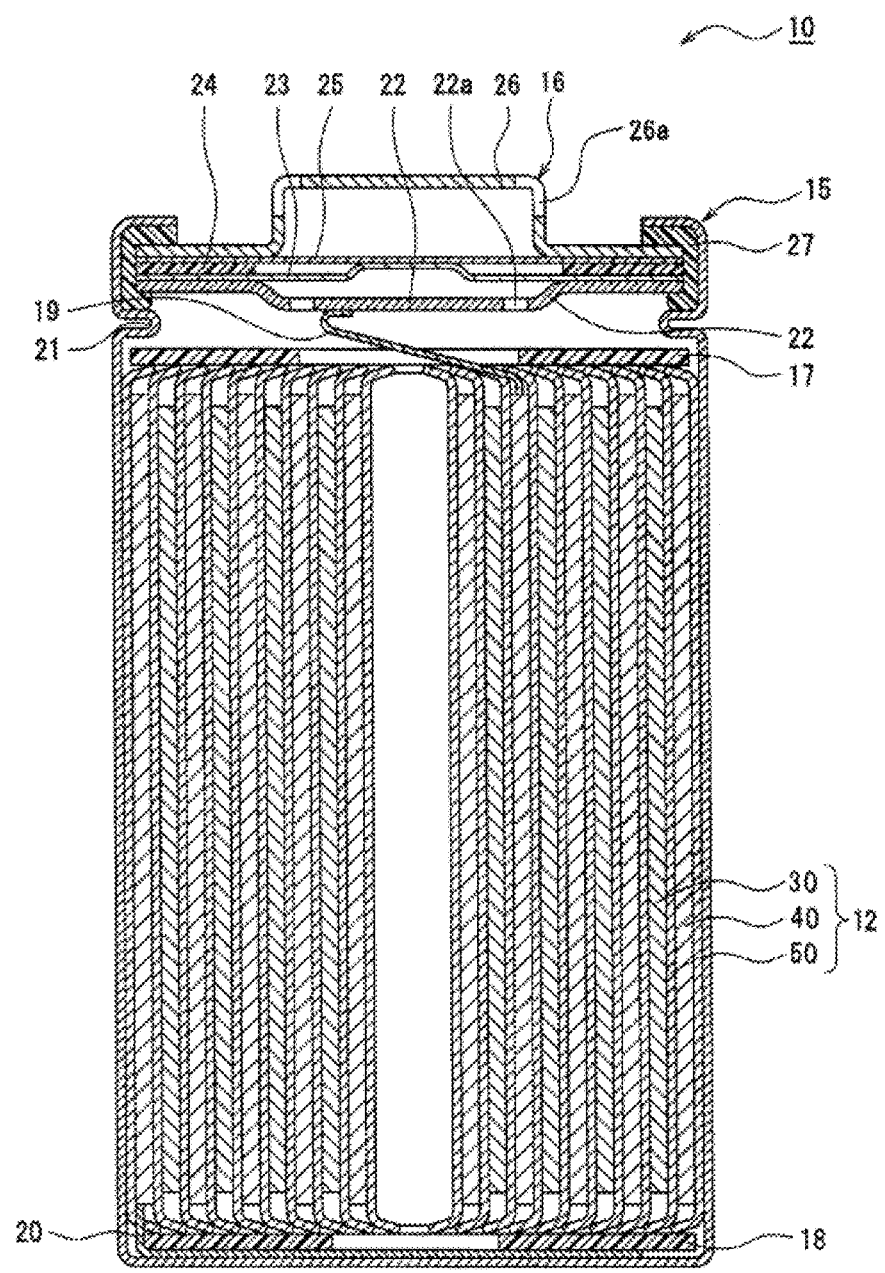
FIG. 1 is a perspective view schematically showing a secondary battery as one exemplary embodiment.

A secondary battery (hereinafter, also simply referred to as "battery") that is one aspect of the present disclosure, comprises: a positive electrode; a negative electrode; and an electrolyte, wherein the positive electrode comprises: a positive electrode current collector including aluminum; a positive electrode mixture layer including a positive electrode active material composed of lithium transition metal oxide; and an intermediate layer provided between the positive electrode current collector and the positive electrode mixture layer, the intermediate layer includes inorganic compound particles, an electrical conductor, and a binder, and the intermediate layer has a porosity of 30% or more and 69% or less, and when a visible outline of a sectional shape of each of the inorganic compound particles is interposed by two concentric circles, an interval of the two circles is minimized such that the inorganic compound particles have an average value of circularity of 5% or more and 75% or less, the circularity being represented by a ratio of a radius a of an inscribed circle of the two circles to a radius b of a circumscribed circle of the two circles, a/b, the interval of the two circles is a difference between the radius a of the inscribed circle and the radius b of the circumscribed circle.

The present inventors have found that the temperature increase due to the internal short circuit between the positive electrode current collector and the positive electrode mixture layer can further be suppressed, and the cycle life can be improved by providing the intermediate layer between the positive electrode current collector and the positive electrode mixture layer. In more detail, the inorganic compound particles having a low circularity are used to make the intermediate layer, and the contact points among the inorganic compound particles are thereby increased to improve the binding power. Thereby, the positive electrode mixture layer is unlikely to peel during charging/discharging cycles, so that the cycle life is improved, and the intermediate layer is unlikely to peel to thereby suppress the short circuit phenomenon, so that the amount of Joule heating can be reduced at the time of the internal short circuit. In addition, an appropriate amount of an electrolytic solution is retained in pores in the intermediate layer and a decrease in the amount of the electrolyte retained in the positive electrode mixture layer is thereby prevented to improve the cycle life, and the electrolyte retained in the intermediate layer is gasified to cause absorption of heat at the time of the internal short circuit and the Joule heating due to the internal short circuit can thereby be suppressed.

Hereinafter, exemplary embodiments of the present disclosure will be described in detail with reference to the drawings. The drawings referred for the description of embodiments are schematically illustrated, and the dimension ratios and the like of the components may be different from the actual things. Specific dimension ratios and the like should be determined in consideration of the description below.

[Secondary Battery]

Using FIG. 1, the configuration of a secondary battery 10 will be described. FIG. 1 is a sectional view of the secondary battery 10 as one example of the embodiments. The secondary battery 10 comprises a positive electrode 30, a negative electrode 40, and an electrolyte. A separator 50 is suitably provided between the positive electrode 30 and the negative electrode 40. The secondary battery 10 has, for example, a configuration in which a wound type electrode assembly 12 in which the positive electrode 30 and the negative electrode 40 are wound together with the separator 50 therebetween and the electrolyte are housed in a battery case. Examples of the battery case for housing the electrode assembly 12 and the electrolyte include a metallic case in a shape, such as a cylindrical shape, a rectangular shape, a coin shape, and a button shape, and a resin case formed by laminating resin sheets (laminate battery). In addition, an electrode in another form, such as a lamination type electrode assembly in which positive electrodes and negative electrodes are alternately laminated with separators therebetween may be applied in place of the wound type electrode assembly 12. In the example shown in FIG. 1, the battery case includes a case main body 15 having a bottomed cylindrical shape and a sealing body 16.

The secondary battery 10 comprises insulating plates 17, 18 disposed on and under the electrode assembly 12 respectively. In the example shown in FIG. 1, a positive electrode lead 19 attached to the positive electrode 30 extends on the side of the sealing body 16 through a through-hole of the insulating plate 17, and a negative electrode lead 20 attached to the negative electrode 40 extends on the bottom side of the case main body 15 through the outside of the insulating plate 18. For example, the positive electrode lead 19 is connected by welding or the like to the underside of a filter 22 that is a bottom plate of the sealing body 16, and a cap 26 that is a top plate of the sealing body 16, the cap electrically connected to the filter 22, is a positive electrode terminal. The negative electrode lead 20 is connected by welding or the like to the inner face of the bottom part of the case main body 15, and the case main body 15 is a negative electrode terminal. In the present embodiment, a current interrupt device (CID) and a gas discharge mechanism (safety valve) are provided in the sealing body 16. A gas discharge valve (not shown) is suitably provided also at the bottom part of the case main body 15.

The case main body 15 is, for example, a metallic container having a bottomed cylindrical shape. A gasket 27 is provided between the case main body 15 and the sealing body 16 and the air tightness inside the battery case is secured. The case main body 15 suitably has an overhanging part 21 which is formed by, for example, pressing the side face part from outside and supports the sealing body 16. The overhanging part 21 is preferably formed into a ring shape along the circumferential direction of the case main body 15 and supports the sealing body 16 at the top side thereof.

The sealing body 16 has the filter 22 in which a filter opening 22a is formed and a valve body disposed on the filter 22. The valve body covers the filter opening 22a of the filter 22 and breaks if the inner pressure of the battery increases due to heat generation by internal short circuit or the like. In the present embodiment, a lower valve body 23 and an upper valve body 25 are each provided as the valve body, and an insulating member 24 disposed between the lower valve body 23 and the upper valve body 25, and the cap 26 having a cap opening 26a are further provided. Respective members included in the sealing body 16 have a disk shape or a ring shape, and respective members excluding the insulating member 24 are electrically connected to one another. Specifically, the filter 22 and the lower valve body 23 are bonded to each other at the peripheral edge parts thereof, and the upper valve body 25 and the cap 26 are also bonded to each other at the peripheral edge parts thereof. The lower valve body 23 and the upper valve body 25 are connected to each other at the central parts thereof with the insulating member 24 interposed between the peripheral edge parts thereof. If the internal pressure increases due to the heat generation by the internal short circuit or the like, for example, the lower valve body 23 breaks at the thin wall part, the upper valve body 25 thereby expands toward the side of the cap 26 and separates from the lower valve body 23, and the electrical connection between the two is thereby cut off

[Positive Electrode]

The positive electrode 30 comprises: a positive electrode current collector 31; a positive electrode mixture layer 32; and an intermediate layer 33 provided between the positive electrode current collector 31 and the positive electrode mixture layer 32.

The positive electrode current collector 31 includes aluminum and is formed of, for example, an aluminum simple substance or metal foil composed of an aluminum alloy. The content of aluminum in the positive electrode current collector 31 is 50 mass % or more, preferably 70 mass % or more, and more preferably 80 mass % or more based on the total amount of the positive electrode current collector 31. The thickness of the positive electrode current collector 31 is not particularly limited, but is, for example, about 10 µm or more and 100 µm or less.

The positive electrode mixture layer 32 includes a positive electrode active material composed of lithium transition metal oxide. Examples of the lithium transition metal oxide include a lithium transition metal oxide containing: lithium (Li); and a transition metal element, such as cobalt (Co), manganese (Mn), and nickel (Ni). The lithium transition metal oxide may include another additive element in addition to Co, Mn, and Ni, and examples thereof include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium transition metal oxide include $Li_xCoO_2$, $Li_xNiO_2$, $Li_xMnO_2$, $Li_xCo_yNi_{1-y}O_z$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (in each chemical formula, M represents at least one of Na, Mg, Sc, Y, Mn, Fe, Co, Ni, Cu, Zn, Al, Cr, Pb, Sb, and B, $0<x\le1.2$, $0<y\le0.9$, and $2.0\le z\le2.3$). These may be used singly or in combinations of two or more thereof.

The positive electrode mixture layer 32 suitably further includes an electrical conductor and a binder. The electrical conductor included in the positive electrode mixture layer 32 is used for enhancing the electrical conductivity of the positive electrode mixture layer 32. Examples of the electrical conductor include carbon materials such as carbon black (CB), acetylene black (AB), Ketjenblack, and graphite. These may be used singly or in combinations of two or more thereof.

The binder included in the positive electrode mixture layer 32 is used for keeping a satisfactory state of contact between the positive electrode active material and the electrical conductor and enhancing the binding performance of the positive electrode active material and the like to the surface of the positive electrode current collector 31. Examples of the binder include fluororesins such as polytetrafluoroethylene (PTFE) and poly(vinylidene fluoride) (PVdF), polyacrylonitrile (PAN), polyimide resins, acrylic resins, and polyolefin resins. These resins may be combined with carboxymethyl cellulose (CMC) or a salt thereof (such as CMC-Na, CMC-K, and CMC-$NH_4$, or may be a partially neutralized salt), polyethylene oxide (PEO), or the like. These may be used singly or in combinations of two or more thereof.

Figure 2:
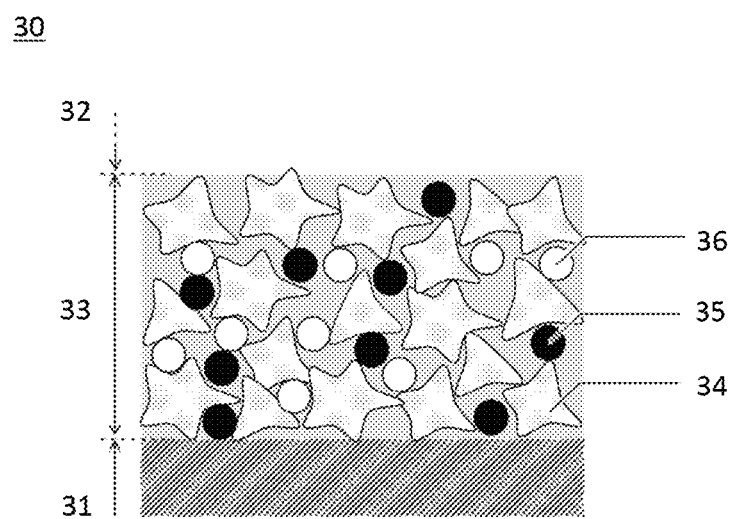
FIG. 2 is a schematic sectional view of an intermediate layer which a positive electrode in a secondary battery as one exemplary embodiment comprises.

The positive electrode 30 comprises the intermediate layer 33 provided between the positive electrode current collector 31 and the positive electrode mixture layer 32. FIG. 2 shows one example of the intermediate layer 33 which the positive electrode 30 comprises. The intermediate layer 33 includes inorganic compound particles 34 (hereinafter, also simply referred to as "inorganic particles 34"), an electrical conductor 35, and a binder 36. The intermediate layer 33 includes the inorganic particles 34 and is provided between the positive electrode current collector 31 and the positive electrode mixture layer 32, thereby serving a function of isolating the positive electrode current collector 31 from the positive electrode mixture layer 32 to suppress the oxidation-reduction reaction between aluminum included in the positive electrode current collector 31 and the lithium transition metal compound included as a positive electrode active material in the positive electrode mixture layer 32.

In the battery 10 according to one exemplary embodiments, the intermediate layer 33 has a porosity of 30% or more and 69% or less. The intermediate layer 33 preferably has a porosity of 50% or more and 65% or less. In the battery 10 that comprises the positive electrode 30 provided with the intermediate layer 33 having a porosity in the range, the pores in the intermediate layer 33 are filled with the electrolyte, so that the intermediate layer 33 retains a larger amount of the electrolyte. Therefore, if the internal short circuit or the like occurs in the battery 10 to generate Joule heating at the positive electrode current collector 31, the electrolyte which the intermediate layer 33 retains vaporizes to cause absorption of heat, and the Joule heating due to the short circuit can be suppressed. It can be considered that the increase in the temperature of the battery accompanying the heat generation of the battery 10 can thereby be suppressed. In addition, by retaining the electrolyte in the intermediate layer 33, the electrolyte is replenished from the intermediate layer 33 if the amount of the electrolyte retained in the positive electrode mixture layer 32 decreases, and thus the liquid-retaining property of the battery 10 can be enhanced and the cycle life of the battery 10 can be prolonged.

Examples of the measuring method for the porosity in the intermediate layer 33 include the following method.

(1) The battery 10 is disassembled to take out the electrode assembly 12, and further, the electrode assembly is separated into the positive electrode 30, the negative electrode 40, and the separator 50.

(2) The positive electrode 30 obtained in (1) is subjected to cross section processing by a Cross-section Polisher (CP) method, and the polished surface is observed with a scanning electron microscope (SEM).

(3) Image processing is carried out on the SEM image obtained in (2) to measure the thickness of the intermediate layer 33.

(4) A predetermined range of the positive electrode 30 obtained in (1) is cut out to obtain a sample which comprises the positive electrode current collector 31, the intermediate layer 33, and the positive electrode mixture layer 32.

(5) The positive electrode mixture layer 32 is cut off from the sample obtained in (4) using a cutting tool or the like, and the intermediate layer 33 is thereafter cut off.

(6) Qualitative analysis and quantitative analysis are carried out for the constituents, such as the inorganic particles 34, the electrical conductor 35, and the binder 36, of the intermediate layer 33 obtained in (5) using known analyzers such as an ICP atomic emission spectroscopic analyzer (e.g. "ICPE-9800" manufactured by SHIMADZU CORPORATION) and energy dispersive X-ray analysis (EDX) (e.g. "EDX-7000" manufactured by SHIMADZU CORPORATION).

(7) The volume of the constituents of the intermediate layer 33 in the sample is calculated from the known true density of each component qualitatively analyzed.

(8) The porosity (%) of the intermediate layer 33 is calculated based on the calculated volume of the constituents of the intermediate layer 33, and the product of the area of the sample and the thickness of the intermediate layer 33, determined in (3).

As another method for measuring the porosity of the intermediate layer 33, for example, a predetermined range in the SEM image obtained in (2) is observed to determine the grain boundaries of the particles, such as the inorganic particles 34, the electrical conductor 35, and the binder 36, which are included in the intermediate layer 33, and draw a visible outline along the surface of each particle, and the porosity of the intermediate layer 33 may be calculated based on the area of the predetermined range and the total area of the parts each surrounded by the visible outline.

Examples of a method for adjusting the porosity of the intermediate layer 33 include a method of using for the intermediate layer 33 the inorganic particles 34 having an uneven shape, which will be described later, a method of mixing a substance that is soluble to the electrolyte with the inorganic particles 34, the electrical conductor 35, and the binder 36 in forming the intermediate layer 33 on the surface of the positive electrode current collector 31, and a method of adjusting the porosity by the type, the content, and the like of the binder 36 to be used for the intermediate layer 33.

The inorganic particles 34 included in the intermediate layer 33 are particles composed of an inorganic compound. The inorganic compound composing the inorganic particles 34 is not particularly limited, but preferably has a lower oxidizing power than the lithium transition metal oxide included in the positive electrode mixture layer 32 from the viewpoint of suppressing the oxidation-reduction reaction. Examples of the inorganic compound include inorganic oxides such as manganese oxide, silicon dioxide, titanium dioxide, and aluminum oxide, and aluminum oxide ($Al_2O_3$) is preferable because of having an excellent high thermal conductivity. The inorganic particles 34 have a central particle diameter (volume average particle diameter measured by light scattering method) of, for example, 1 μm or less, and preferably 0.2 μm or more and 0.9 μm or less.

Figure 3:
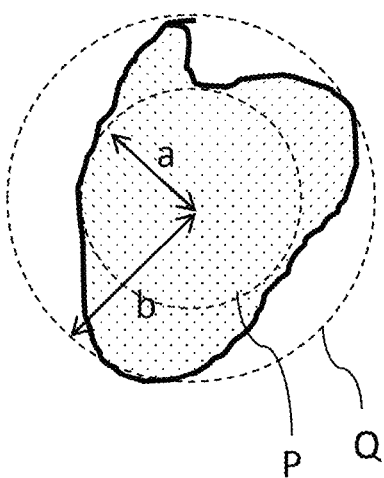
FIG. 3 is a schematic diagram showing one example of a sectional shape of an inorganic compound particle.

FIG. 3 is a schematic diagram showing one example of a sectional shape of the inorganic particle 34. When a visible outline of a sectional shape of each of the inorganic particles 34 is interposed by two concentric circles (inscribed circle P and circumscribed circle Q), an interval of the two circles is minimized such that the inorganic particles 34 have an average value of circularity of 5% or more and 75% or less, more preferably 5% or more and 50% or less, still more preferably 5% or more and 30% or less, and particularly preferably 5% or more and 20% or less, wherein the circularity being represented by a ratio of a radius a of an inscribed circle P of the two circles to a radius b of a circumscribed circle Q of the two circles, a/b, the interval of the two circles is a difference between the radius a of the inscribed circle and the radius b of the circumscribed circle.

By setting the circularity of the inorganic particles 34 to the range, the contact points among the inorganic particles 34 are increased to strengthen the binding power, and the peel strength for peeling the positive electrode mixture layer 32 from the positive electrode current collector 31 on which the intermediate layer 33 is formed is improved. This is because, thereby, the positive electrode mixture layer 32 is unlikely to peel during charging/discharging cycles and the cycle life is thereby improved, and further, the intermediate layer 33 is unlikely to peel at the time of the internal short circuit and the progress of the oxidation-reduction between the positive electrode active material and aluminum included in the positive electrode current collector 31 can thereby be suppressed.

Specific examples of the method for measuring the circularity of the inorganic particles 34 include the following method.

(1) The inorganic particles 34 included in the intermediate layer 33 are taken out in the same manner as in (1), (4), and (5) in the measuring method for the porosity of the intermediate layer 33.
(2) The inorganic particles 34 taken out are embedded in a resin, and the inorganic particles 34 are then subjected to cross section processing by the CP method to observe the polished surface with the SEM.
(3) From the SEM image obtained in (2), 100 inorganic particles 34 are selected randomly.
(4) A visible outline along the surface of each inorganic particle 34 is drawn for the selected 100 inorganic particles 34.
(5) For each inorganic particle 34, the inscribed circle P that inscribes the visible outline and the circumscribed circle P that circumscribes the visible outline, which are such that the two circles are concentric and the difference in the radius between the two circles is minimized, are determined to calculate the ratio of the difference a in the radius between the two circles to the radius b of the circumscribed circle Q, a/b, and the ratio a/b is defined as the circularity of the inorganic particle 34.
(6) The average value is determined from the circularity calculated for each of 100 inorganic particles 34.

Figure 5:
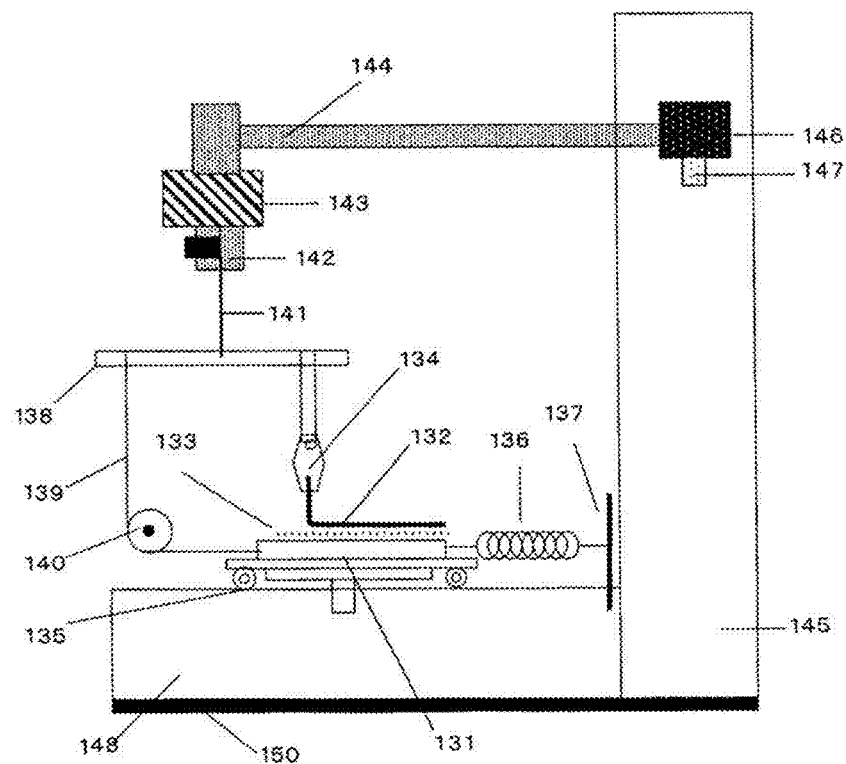
FIG. 5 is a schematic diagram showing an apparatus for measuring peel strength.

The measuring method for the peel strength of the positive electrode mixture layer 32 will be described. FIG. 5 is an apparatus for measuring the peel strength. The apparatus shown in FIG. 5 is configured by a base table 131 for mounting a test object 132; an adhesive member 133, such as a double-sided tape, for fixing the test object 132; a chuck 134 for fixing one end of the test object 132, the chuck connected to a lift table 138; a bearing region 135 for enabling the base table 131 to slide horizontally and easily; a spring 136 for uniformly applying force to the base table 131 at the time of sliding; a fixing part 137 to which the spring 136 is connected; the lift table 138 connected to the base table 131 via a wire 139 and a pulley 140; a wire 141 for connecting the lift table 138 and a gripping jig 142; a load cell 143 for detecting the load of the lift table 138, the load cell connected to the gripping jig 142; further, a support part 144 for supporting the load cell 143; a drive part 146 for moving the support part 144 vertically; a linear sensor 147 for detecting the moving amount of the gripping jig 142, provided at the drive part 146; a support 145 having the drive part 146 and the linear sensor 147 built-in; and a support table 148 for supporting the base table 131, and the support table 148 and the support 145 are fixed to a base 150.

The measurement of the peel strength is carried out in the following manner. That is, the test object 132 is cut into a certain size and fixed to the base table 131 with the adhesive member 133, and the one end thereof is fixed with the chuck 134. The drive part 146 is started to lift the gripping jig 142 at a constant speed, the lift table 138 is thereby pulled, allowing the chuck 134 to lift the test object 132, the test object 132 is thereby peeled, and the stress on that occasion is measured with a load cell 143, to thereby carry out a peel test.

The wire 139 pulls the base table 131 at the time of lifting, and thus the test object 132 is always peeled at a right angle. By carrying out a lift test using only this measuring test apparatus from which the test object 132 has been detached after the measurement, a force component at the time when only the base table 131 slides can be measured. By subtracting the force component at the time when the base table 131 slides from the result of the peel test, the interlayer peel strength of the test object 132 can be measured correctly.

The content of the inorganic particles 34 included in the intermediate layer 33 is preferably 70 mass % or more and 99.8 mass % or less, and more preferably 90 mass % or more and 99 mass % or less based on the total amount of the intermediate layer 33. When the content of the inorganic particles 34 is within the range, an effect of suppressing the oxidation-reduction reaction is improved to make it easy to reduce the amount of heat to be generated at the time of occurrence of abnormality.

The electrical conductor 35 included in the intermediate layer 33 is used for securing a satisfactory current collectability of the positive electrode 30. The electrical conductor 35 may be, for example, the same type of the electrical conductor 35 to be used in the positive electrode mixture layer 32, and specific examples thereof include, but not limited to, carbon materials such as carbon black (CB), acetylene black (AB), Ketjenblack, and graphite. These may be used singly or in combinations of two or more thereof.

The content of the electrical conductor 35 included in the intermediate layer 33 is preferably 0.1 mass % or more and 20 mass % or less, and more preferably 1 mass % or more and 10 mass % or less based on the total amount of the intermediate layer 33. From the viewpoint of securing the current collectability, the content of the electrical conductor 35 in the intermediate layer 33 is preferably higher than the content of the electrical conductor in the positive electrode mixture layer 32. Particularly, in the positive electrode 30 in which the porosity of the intermediate layer 33 is higher than the porosity of the positive electrode mixture layer 32, the content of the electrical conductor 35 based on the total amount of the intermediate layer 33 is preferably 1 mass % or more and 7 mass % or less, or the content of the electrical conductor 35 based on the total amount in the intermediate layer 33 is preferably 1.1 times or more and 7.8 times or less than the content of the electrical conductor based on the total amount in the positive electrode mixture layer 32.

The binder 36 included in the intermediate layer 33 is used for binding the inorganic particles 34 and the electrical conductor 35 to secure the mechanical strength of the intermediate layer 33 and enhance the binding performance between the intermediate layer 33 and the positive electrode current collector 31. The binder 36 included in the intermediate layer 33 may be, for example, the same type of the binder to be used in the positive electrode mixture layer 32, and specific examples thereof include, but not limited to, fluororesins such as PTFE and PVdF, PAN, polyimide resins, acrylic resins, and polyolefin resins. These may be used singly or in combinations of two or more of thereof. The content of the binder 36 is preferably 0.1 mass % or more and 20 mass % or less, and more preferably 1 mass % or more and 10 mass % or less based on the total amount of the intermediate layer 33.

The thickness of the intermediate layer 33 is, for example, 1 μm or more and 7 μm or less, and preferably 1 μm or more and 5 μm or less. This is because if the intermediate layer 33 is too thin, the effect of suppressing the oxidation-reduction reaction at the time of occurrence of abnormality may be deficient, and if the intermediate layer 33 is too thick, the energy density of the positive electrode 30 decreases.

The intermediate layer 33 can be formed by, for example, applying an intermediate layer slurry including the inorganic particles 34, the electrical conductor 35, and the binder 36 to the surface of the positive electrode current collector 31 and drying the applying layer. When the positive electrode mixture layer 32 is provided on each side of the positive electrode current collector 31, the intermediate layer 33 is also provided on each side of the positive electrode current collector 31.

As described above, a substance that is soluble in the electrolyte may be mixed with the intermediate layer slurry for the purpose of adjusting the porosity of the intermediate layer 33. By applying the intermediate layer slurry including the soluble substance and drying the resulting applying layer, thereby forming the intermediate layer 33, the soluble substance dissolves into the electrolyte filling the pores in the intermediate layer 33 in producing the battery 10. Thereby, pores which can be filled with the electrolyte can be increased in the intermediate layer 33. Examples of the substrate that is soluble to the electrolyte and can be mixed with the intermediate layer slurry include a non-aqueous solvent such as ethylene carbonate (EC) and an electrolyte salt such as $LiPF_6$.

The positive electrode 30 according to the present embodiment may be produced by, for example, a method in which a positive electrode mixture slurry obtained by mixing the positive electrode active material, the electrical conductor, the binder, and a dispersion medium such as N-methyl-2-pyrrolidone (NMP) is applied to the positive electrode current collector 31 on which the intermediate layer 33 is formed, the resulting applying layer is dried, and the resulting product is rolled to form the positive electrode mixture layer 32. The method of applying the positive electrode mixture slurry to the surface of the positive electrode current collector 31 is not particularly limited, and the application can be carried out by using a well-known applying apparatus, such as a gravure coater, a slit coater, and a die coater.

In the positive electrode 30, the porosity of the intermediate layer 33 is preferably higher than the porosity of the positive electrode mixture layer 32, and is more preferably higher than the porosity of the positive electrode mixture layer 32 by 4% or more and 15% or less. This is because a larger amount of the electrolytic solution can thereby be retained than in a conventional intermediate layer. From the viewpoint of adhesiveness between the intermediate layer 33 and the positive electrode mixture layer 32, the active material density of the positive electrode mixture layer is preferably 3.0 $g/cm^3$ or more. Also, from the viewpoint of adhesiveness between the intermediate layer 33 and the positive electrode mixture layer 32, the thickness of the positive electrode mixture layer is desirably 150 μm or more and 240 μm or less. The measurement of the porosity of the positive electrode mixture layer 32 may be carried out, for example, according to the measuring method for the porosity of the intermediate layer 33. With respect to method for adjusting the porosity of the positive electrode mixture layer 32, the porosity can be adjusted by, for example, the contents of the positive electrode active material, the electrical conductor, and the binder, the type of the binder, and further, the pressure at the time of rolling, and the like in forming the positive electrode mixture layer 32.

[Negative Electrode]

The negative electrode 40 includes, for example, a negative electrode current collector formed of metal foil or the like and a negative electrode mixture layer formed on the surface of the collector. Foil of a metal, such as copper, that is stable in the electric potential range of the negative electrode, a film with such a metal disposed on an outer layer, and the like can be used for the negative electrode current collector. The negative electrode mixture layer suitably includes a binder in addition to a negative electrode active material. The negative electrode 40 can be manufactured by, for example, applying a negative electrode mixture slurry including the negative electrode active material, the binder, and other components to the negative electrode current collector, drying the resulting applying layer, and rolling the resulting product to form a negative electrode mixture layer on each side of the collector.

The negative electrode active material is not particularly limited as long as it is a compound that can reversibly intercalate and deintercalate lithium ions, and, for example, a carbon material, such as natural graphite and artificial graphite, a metal, such as silicon (Si) and tin (Sn), that can be alloyed with lithium, an alloy or composite oxide including a metal element, such as Si and Sn, or the like can be used. The negative electrode active materials can be used singly or in combinations of two or more thereof.

As the binder included the negative electrode mixture layer, similarly to the case of the positive electrode 30, a fluorocarbon resin such as PTFE, PAN, a polyimide resin, an acrylic resin, a polyolefin resin, or the like can be used. When the negative electrode mixture slurry is prepared using an aqueous solvent, styrene-butadiene rubber (SBR), CMC or its salt, poly(acrylic acid) (PAA) or its salt (such as PAA-Na and PAA-K, or may be a partially neutralized salt), poly(vinyl alcohol) (PVA), or the like is preferably used.

[Separator]

An ion-permeable and insulating porous sheet is used as the separator 50. Specific examples of the porous sheet include a microporous thin film, woven fabric, and nonwoven fabric. Suitable examples of the material for the separator 50 include olefin resins such as polyethylene and polypropylene, and cellulose. The separator 50 may be a laminate including a cellulose fiber layer and a layer of fibers of a thermoplastic resin such as an olefin resin. The separator 50 may be a multi-layered separator including a polyethylene layer and a polypropylene layer, and the separator 50 a surface of which is coated with a resin such as an aramid resin may also be used.

A filler layer including a filler of an inorganic substance may be formed on an interface between the separator 50 and at least one of the positive electrode 30 and the negative electrode 40. Examples of the filler of an inorganic substance include an oxide containing at least one of titanium (Ti), aluminum (Al), silicon (Si), and magnesium (Mg) and a phosphoric acid compound. The filler layer can be formed by, for example, applying a slurry containing the filler to the surface of the positive electrode 30, the negative electrode 40, or the separator 50.

[Electrolyte]

The electrolyte includes a solvent and an electrolyte salt dissolved in the solvent. As the electrolyte, a solid electrolyte using a gel polymer or the like can be used, but from the viewpoint of easiness of filling into the pores in the intermediate layer 33 and of suppressing the temperature increase at the time of occurrence of abnormality, the electrolyte is preferably a liquid electrolyte such as a non-aqueous electrolyte (electrolytic solution). As the solvent, for example, a non-aqueous solvent such as an ester, an ether, a nitrile such as acetonitrile, an amide such as dimethylformamide, and a mixed solvent of two or more of these solvents can be used. The non-aqueous solvent may contain a halogen-substituted product formed by replacing at least one hydrogen atom of any of the above solvents with a halogen atom such as fluorine.

Examples of the ester include cyclic carbonate esters such as ethylene carbonate (EC), propylene carbonate (PC), and butylene carbonate; chain carbonate esters such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP), ethyl propionate, and γ-butyrolactone.

Examples of the ether include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogen-substituted product, a fluorinated cyclic carbonate ester such as fluoroethylene carbonate (FEC), a fluorinated chain carbonate ester, or a fluorinated chain carboxylate ester such as methyl fluoropropionate (FMP) is preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $Li(P(C_2O_4)F_2)$, $LiPF_{6-x}(C_nF_{2n+1})_x$ (where $1<x<6$, and n is 1 or 2), $LiB_{10}Cl_{10}$, LiCl, LiBr, LiI, chloroborane lithium, lithium short-chain aliphatic carboxylates, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {where l and m are integers of 1 or more}. As the lithium salt, these may be used singly or in combinations of two or more thereof. Among these, $LiPF_6$ is preferably used from the viewpoint of ionic conductivity, electrochemical stability, and the like. The concentration of the lithium salt is preferably set to 0.8 to 1.8 mol per 1 L of a solvent.

EXAMPLES

Hereinafter, the present disclosure will be described in more detail with Examples, but the present disclosure is not limited to these Examples.

Example 1

[Production of Positive Electrode]

Figure 4:
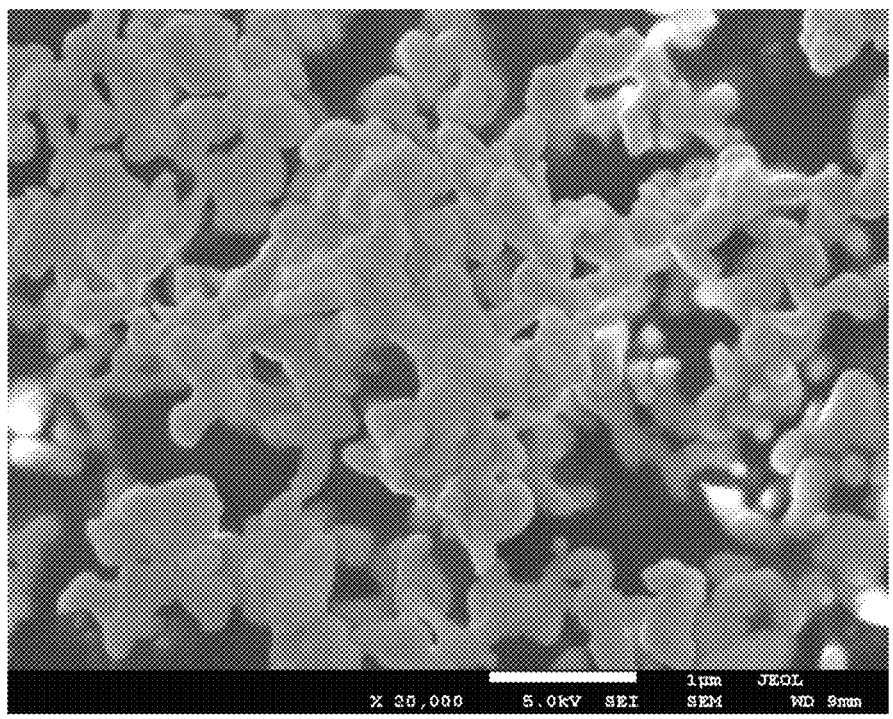
FIG. 4 is an SEM image showing inorganic compound particles included in an intermediate layer of Example 1.

An intermediate layer slurry was prepared by mixing 93.5 parts by weight of inorganic particles 34 composed of aluminum oxide ($Al_2O_3$), 5 parts by weight of acetylene black (AB), and 1.5 parts by weight of poly(vinylidene fluoride) (PVdF), and further, adding an appropriate amount of N-methyl-2-pyrrolidone (NMP). Next, the intermediate slurry was applied on each side of a positive electrode current collector 31 formed of aluminum foil having a thickness of 15 μm, and the applied slurry was dried to form an intermediate layer 33 having a thickness of 2.1 μm. FIG. 4 shows an SEM photograph of the inorganic particles 34 used in Example 1.

A positive electrode mixture slurry was prepared by mixing 97 parts by weight of a lithium transition metal oxide represented by $LiNi_{0.82}Co_{0.15}Al_{0.03}O_2$ as a positive electrode active material, 2 parts by weight of acetylene black (AB), and 1 part by weight of poly(vinylidene fluoride) (PVdF), and further, adding an appropriate amount of N-methyl-2-pyrrolidone (NMP). Next, the positive electrode mixture slurry was applied on each side of the positive electrode current collector 31 having the intermediate layer 33 formed on each side thereof, and the applied slurry was dried. The resulting product was cut into a predetermined electrode size and then rolled using a roller to produce a positive electrode 30 having the intermediate layer 33 and the positive electrode mixture layer 32 formed in sequence on each side of the positive electrode current collector 31. As a result of carrying out calculation on the produced positive electrode 30, based on the image processing based on the SEM image obtained by the cross section processing by the CP method, and true densities of the inorganic particles 34, the electrical conductor 35, and the binder 36 each included in the intermediate layer 33, the porosity of the intermediate layer 33 was 36%. The porosity of the positive electrode mixture layer 32, which was calculated similarly, was 52%.

[Production of Negative Electrode]

A negative electrode mixture slurry was prepared by mixing 98.7 parts by weight of a graphite powder, 0.7 parts by weight of carboxymethyl cellulose (CMC), and 0.6 parts by weight of styrene-butadiene rubber (SBR), and further, adding an appropriate amount of water. Next, the negative electrode mixture slurry was applied on each side of the negative electrode current collector formed of copper foil, and the applied slurry was dried. The resulting product was cut into a predetermined electrode size and then rolled using a roller to produce a negative electrode 40 having a negative electrode mixture layer formed on each side of the negative electrode current collector.

[Production of Non-Aqueous Electrolytic Solution]

Ethylene carbonate (EC), methyl ethyl carbonate (EMC), and dimethyl carbonate (DMC) were mixed in a volume ratio of 3:3:4. LiPF$_6$ was dissolved in the mixed solvent at a concentration of 1 mol/L to produce a non-aqueous electrolytic solution.

[Production of Battery]

The produced positive electrode 30 and negative electrode 40 were spirally wound through the separator 50 to thereby produce a wound type electrode assembly. As the separator 50, a microporous polyethylene film having a heat resistant layer in which polyamide and a filler of aluminum were dispersed formed on one side thereof was used. The electrode assembly was housed in a case main body 15 having a bottomed cylindrical shape, the case main body having an outer diameter of 18 mm and a height of 65 mm, and after the non-aqueous electrolytic solution was injected thereinto, the opening of the case main body 15 was sealed by a gasket and a sealing body, to thereby produce a cylindrically shaped non-aqueous electrolyte secondary battery of a 18650 type, the battery having a rated capacity of 3100 mAh.

Example 2

A battery 10 was produced in the same manner as in Example 1, except that the inorganic particles 34 used and the thickness of the intermediate layer 33 were changed in the step of producing the positive electrode 30. The average circularity of the inorganic particles 34 used was 10%, and the central particle diameter thereof was 0.6 pun for the positive electrode 30. The thickness of the intermediate layer 33 was 2.1 µm, and the porosity of the intermediate layer 33 was 36%.

Example 3

A battery 10 was produced in the same manner as in Example 1, except that the inorganic particles 34 used and the thickness of the intermediate layer 33 were changed in the step of producing the positive electrode 30. The average circularity of the inorganic particles 34 used was 50%, and the central particle diameter thereof was 0.6 pun for the positive electrode 30. The thickness of the intermediate layer 33 was 3.0 µm, and the porosity of the intermediate layer 33 was 55%.

Example 4

A battery 10 was produced in the same manner as in Example 1, except that the inorganic particles 34 used and the thickness of the intermediate layer 33 were changed in the step of producing the positive electrode 30. The average circularity of the inorganic particles 34 used was 30%, and the central particle diameter thereof was 0.6 pun for the positive electrode 30. The thickness of the intermediate layer 33 was 3.0 µm, and the porosity of the intermediate layer 33 was 55%.

Example 5

A battery 10 was produced in the same manner as in Example 1, except that the inorganic particles 34 used and the thickness of the intermediate layer 33 were changed in the step of producing the positive electrode 30. The average circularity of the inorganic particles 34 used was 10%, and the central particle diameter thereof was 0.6 pun for the positive electrode 30. The thickness of the intermediate layer 33 was 3.0 µm, and the porosity of the intermediate layer 33 was 55%.

Example 6

A battery 10 was produced in the same manner as in Example 1, except that the inorganic particles 34 used and the thickness of the intermediate layer 33 were changed in the step of producing the positive electrode 30. The average circularity of the inorganic particles 34 used was 30%, and the central particle diameter thereof was 0.6 pun for the positive electrode 30. The thickness of the intermediate layer 33 was 3.5 µm, and the porosity of the intermediate layer 33 was 61%.

Example 7

A battery 10 was produced in the same manner as in Example 1, except that the inorganic particles 34 used and the thickness of the intermediate layer 33 were changed in the step of producing the positive electrode 30. The average circularity of the inorganic particles 34 used was 10%, and the central particle diameter thereof was 0.6 pun for the positive electrode 30. The thickness of the intermediate layer 33 was 3.5 µm, and the porosity of the intermediate layer 33 was 61%.

Example 8

A battery 10 was produced in the same manner as in Example 1, except that the inorganic particles 34 used and the thickness of the intermediate layer 33 were changed in the step of producing the positive electrode 30. The average circularity of the inorganic particles 34 used was 30%, and the central particle diameter thereof was 0.6 pun for the positive electrode 30. The thickness of the intermediate layer 33 was 4.3 min, and the porosity of the intermediate layer 33 was 69%.

Example 9

A battery 10 was produced in the same manner as in Example 1, except that the inorganic particles 34 used and the thickness of the intermediate layer 33 were changed in the step of producing the positive electrode 30. The average circularity of the inorganic particles 34 used was 10%, and the central particle diameter thereof was 0.6 pun for the positive electrode 30. The thickness of the intermediate layer 33 was 4.3 µm, and the porosity of the intermediate layer 33 was 69%.

Example 10

A battery 10 was produced in the same manner as in Example 1, except that the inorganic particles 34 used and the thickness of the intermediate layer 33 were changed in the step of producing the positive electrode 30. The average circularity of the inorganic particles 34 used was 70%, and the central particle diameter thereof was 0.6 pun for the positive electrode 30. The thickness of the intermediate layer 33 was 3.0 µm, and the porosity of the intermediate layer 33 was 55%.

Comparative Example 1

A non-aqueous electrolyte secondary battery was produced in the same manner as in Example 1, except that the intermediate layer was not provided.

[Nail Penetration Test]

A nail penetration test was carried out according to the following procedure for each battery 10.

(1) In an environment of 25° C., charging was carried out at a constant current of 600 mA to a battery voltage of 4.2 V, and discharging was subsequently carried out at a constant voltage to a current of 90 mA.

Table 1 shows the results of the nail penetration test, the test of measuring the peel strength of the positive electrode mixture layer, and the test of measuring the cycle life which were carried out for each of the non-aqueous electrolyte secondary batteries of the Examples and Comparative Example 1.

TABLE 1

| Battery | Intermediate layer | | | | Battery characteristics | | |
| --- | --- | --- | --- | --- | --- | --- | --- |
| | Circularity of inorganic particles [%] | Thickness of one side [μm] | Area density of one side [g/m²] | Porosity [%] | Peel strength [N/m] | Number of cycles when capacity retention rate reaches 70% | Nail penetration test Surface temperature of battery 1 minute after short circuit |
| Example 1 | 30 | 2.1 | 5.0 | 36 | 60.0 | 609 | 39 |
| Example 2 | 10 | 2.1 | 5.0 | 36 | 64.3 | 611 | 36 |
| Example 3 | 50 | 3.0 | 5.0 | 55 | 35.0 | 607 | 43 |
| Example 4 | 30 | 3.0 | 5.0 | 55 | 42.0 | 612 | 36 |
| Example 5 | 10 | 3.0 | 5.0 | 55 | 45.0 | 613 | 36 |
| Example 6 | 30 | 3.5 | 5.0 | 61 | 36.0 | 610 | 38 |
| Example 7 | 10 | 3.5 | 5.0 | 61 | 38.6 | 614 | 35 |
| Example 8 | 30 | 4.3 | 5.0 | 69 | 29.3 | 608 | 41 |
| Example 9 | 10 | 4.3 | 5.0 | 69 | 31.4 | 610 | 39 |
| Example 10 | 70 | 3.0 | 5.0 | 55 | 30.6 | 606 | 50 |
| Comparative Example 1 | — | — | — | — | 21.8 | 600 | 120 |

(2) In an environment of 25° C., the tip of a round nail having a thickness of 2.7 mmϕ was brought into contact with the central part of the side of each battery 10 charged in (1) and was stuck in a direction of laminating the electrode assembly 12 of the battery 10 at a rate of 1 mm/sec, and sticking the round nail was stopped immediately after a voltage drop of the battery due to internal short circuit was detected.

(3) The surface temperature of the battery 1 minute after the short circuit of the battery was caused by the round nail was measured.

[Test of Measuring Peel Strength of Positive Electrode Mixture Layer]

The peel strength of the positive electrode mixture layer in the positive electrode used for each non-aqueous electrolyte secondary battery was measured in the following manner. That is, the positive electrode was cut into a size of a length of 15 mm and a width of 120 mm, and a portion thereof with 80 mm in width was fixed to a base table by adhesion using an apparatus as shown in FIG. 5 to carry out the peel test. Thereafter, a lift test was carried out without installing a positive electrode to measure the force component at the time when only the base table 131 slid, the force component at the time when the base table 131 slid was subtracted from the result of the peel test, and the result was converted into the peel strength per unit length (m). The peel strength of 5 samples was measured for each positive electrode of the non-aqueous electrolyte secondary batteries.

[Test of Measuring Cycle Life]

Charging/discharging cycles were repetitively carried out on each non-aqueous electrolyte secondary battery at a temperature of 25° C., a single charging/discharging cycle consisting of a constant current-constant voltage charging of a battery at a current of 1500 mA to 4.2 V and 150 mA, a quiescent period of 10 minutes, a constant current discharging of a battery at a current of 3100 mA to 2.5 V, and another quiescent period of 10 minutes. A ratio of the discharge capacity to the initial discharge capacity was defined as a capacity retention ratio, and the number of cycles at the point in time when the capacity retention ratio reached 70% was counted.

As can be seen from the results shown in Table 1, according to the batteries 10 of the Examples: each including the inorganic particles 34 having a circularity of 5% or more and 75% or less, the electrical conductor 35, and the binder 36; and each having the intermediate layer 33 which has a porosity of 30% or more and 69% or less formed between the positive electrode current collector 31 and the positive electrode mixture layer 32, heat generation in the nail penetration test is suppressed considerably, and the cycle life is improved. It can be considered that this result is obtained because the intermediate layer 33 and the positive electrode mixture layer 32 are unlikely to peel off the positive electrode current collector 31, and moreover, an appropriate amount of the non-aqueous electrolytic solution is retained in the pores in the intermediate layer 33 by providing the intermediate layer 33 between the positive electrode current collector 31 and the positive electrode mixture layer 32. It can be considered that when the intermediate layer 33 and the positive electrode mixture layer 32 are unlikely to peel during the charging/discharging cycles and at the time of the internal short circuit, the oxidation-reduction reaction between aluminum included in the positive electrode current collector 31 and the positive electrode active material included in the positive electrode mixture layer 32 is thereby suppressed, so that the amount of Joule heating is reduced. Furthermore, it can be considered that when an appropriate amount of the non-aqueous electrolytic solution is retained in the intermediate layer 33, a decrease in the amount of the non-aqueous electrolytic solution in the positive electrode mixture layer is thereby prevented, so that the life cycle is improved, and moreover, the non-aqueous electrolytic solution absorbs the Joule heating at the time of internal short circuit, so that the temperature increase at the time of the internal short circuit is suppressed.

According to the results shown in Table 1, in the non-aqueous electrolyte secondary batteries of Examples 3 to 7, wherein the porosity of the intermediate layer is included in the range of 50% or more and 65% or less, the cyclic characteristics are further improved, as compared to the non-aqueous electrolyte secondary batteries among the other Examples, each using the inorganic particles having the same circularity. In addition, according to the results shown in Table 1, when the non-aqueous electrolyte secondary batteries each having the same porosity in the Examples are compared, the smaller the circularity is, the more the cyclic characteristics and the peel characteristic are improved.

REFERENCE SIGNS LIST 10 secondary battery (battery)
12 electrode assembly
15 case main body
16 sealing body
17 insulating plate
18 insulating plate
19 positive electrode lead
20 negative electrode lead
21 overhanging part
22 filter
22a filter opening
23 lower valve body
24 insulating member
25 upper valve body
26 cap
26a cap opening
27 gasket
30 positive electrode
31 positive electrode current collector
32 positive electrode mixture layer
33 intermediate layer
34 inorganic compound particle (inorganic particle)
35 electrical conductor
36 binder
40 negative electrode
50 separator
131 base table
132 test object
133 adhesive member
134 chuck
135 bearing region
136 spring
137 fixing part
138 lift table
139 wire
140 pulley
141 wire
142 gripping jig
143 load cell
144 support part
145 support
146 drive part
147 linear sensor
148 support table
150 base

The invention claimed is:

1. A secondary battery, comprising:
a positive electrode;
a negative electrode; and
an electrolyte, wherein
the positive electrode comprises:
 a positive electrode collector including aluminum;
 a positive electrode mixture layer including a positive electrode active material composed of lithium transition metal oxide; and
 an intermediate layer provided between the positive electrode collector and the positive electrode mixture layer,
the intermediate layer includes inorganic compound particles, an electrical conductor, and a binder, and the intermediate layer has a porosity of 30% or more and 69% or less, and
when a visible outline of a sectional shape of each of the inorganic compound particles is interposed by two concentric circles, an interval of the two circles is minimized such that the inorganic compound particles have an average value of circularity of 5% or more and 75% or less, the circularity being represented by a ratio of a radius a of an inscribed circle of the two circles to a radius b of a circumscribed circle of the two circles, a/b,
the interval of the two circles is a difference between the radius a of the inscribed circle and the radius b of the circumscribed circle.

2. The secondary battery according to claim 1, wherein the positive electrode mixture layer has an active material density of 3.0 g/cm$^3$ or more.

3. The secondary battery according to claim 1, wherein the positive electrode mixture layer has a thickness of 150 μm or more and 240 μm or less.

4. The secondary battery according to claim 1, wherein a porosity of the intermediate layer is higher than a porosity of the positive electrode mixture layer.

5. The secondary battery according to claim 4, wherein the porosity of the intermediate layer is higher than the porosity of the positive electrode mixture layer by 4% or more and 15% or less.

6. The secondary battery according to claim 4, wherein a content of the electrical conductor included in the intermediate layer is 1 mass % or more and 7 mass % or less based on the total amount of the intermediate layer.

7. The secondary battery according to claim 4, wherein a content of the electrical conductor included in the intermediate layer based on the total amount of the intermediate layer is 1.1 times or more and 7.8 times or less than a content of the electrical conductor included in the positive electrode mixture layer based on the total amount of the positive electrode mixture layer.

8. The secondary battery according to claim 1, wherein the inorganic compound particles have a central particle diameter of 1 μm or less.

9. The secondary battery according to claim 1, wherein the inorganic compound is aluminum oxide.

* * * * *